United States Patent [19]
Sire

[11] 4,387,466
[45] Jun. 7, 1983

[54] HALF-DUPLEX DIGITAL TRANSMISSION SYSTEM

[75] Inventor: Alain Sire, Paris, France

[73] Assignee: Societe Anonyme de Telecommunications, Paris, France

[21] Appl. No.: 247,863

[22] Filed: Mar. 26, 1981

[30] Foreign Application Priority Data

Mar. 28, 1980 [FR] France ................................ 80 07014

[51] Int. Cl.³ .............................................. H04B 7/14
[52] U.S. Cl. ......................................... 375/4; 370/61; 370/94; 370/97; 370/117; 455/15; 455/18
[58] Field of Search ............. 179/170 R, 170 K, 16 E, 179/16 EA, 16 EC, 16 F; 370/35, 58, 60, 61, 85, 94, 97, 117; 375/3, 4; 455/7, 15, 16, 18

[56] References Cited

U.S. PATENT DOCUMENTS

| | | | |
|---|---|---|---|
| 1,568,891 | 1/1926 | Espenschied | 179/170 K |
| 2,666,845 | 1/1954 | Colton et al. | 455/15 |
| 3,611,435 | 10/1971 | Cooper | 455/18 |
| 3,646,441 | 2/1972 | Magnuski | 455/18 |
| 4,135,156 | 1/1979 | Sanders, Jr. | 370/94 |
| 4,232,197 | 11/1980 | Acampora et al. | 370/97 |

*Primary Examiner*—Benedict V. Safourek
*Attorney, Agent, or Firm*—Lowe, King, Price & Becker

[57] ABSTRACT

The system comprises two terminal stations connected through a two-wire transmission line including bidirectional repeaters. The duration of each half-duplex cycle between successive emissions of two digital packets from a terminal station is independent of the length or range of the line. In particular, the half-duplex cycle duration is less than the transmission duration of two packets along two opposite transmission directions for a line having a great length. The system is characterized in that at least one of repeaters comprises a memorizing circuit for delaying each packet which is received along one of the transmission directions, with at least two times the duration of a packet, thereby retransmit it after the transit of another packet along the other transmission duration through the repeater.

16 Claims, 13 Drawing Figures

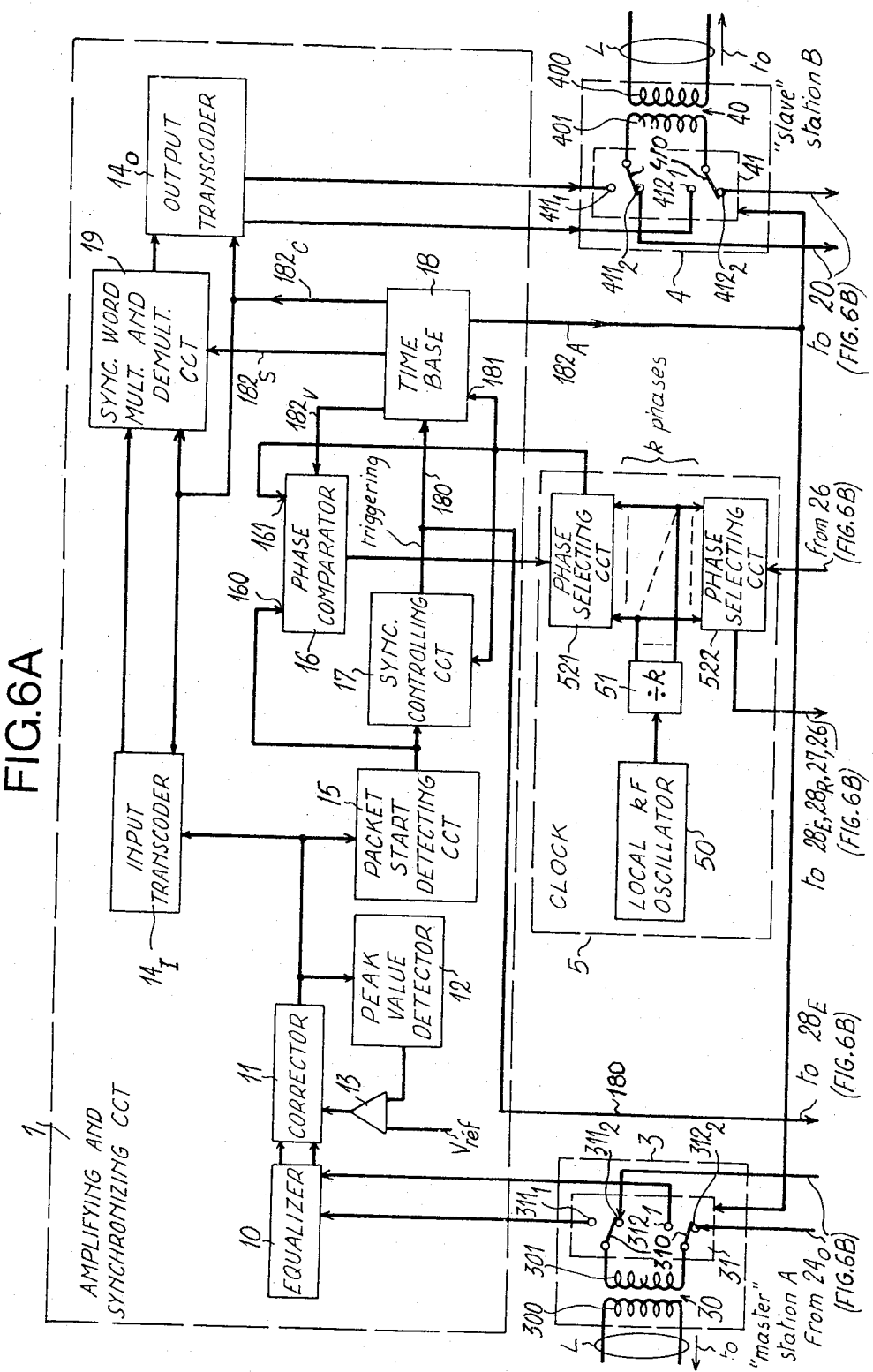

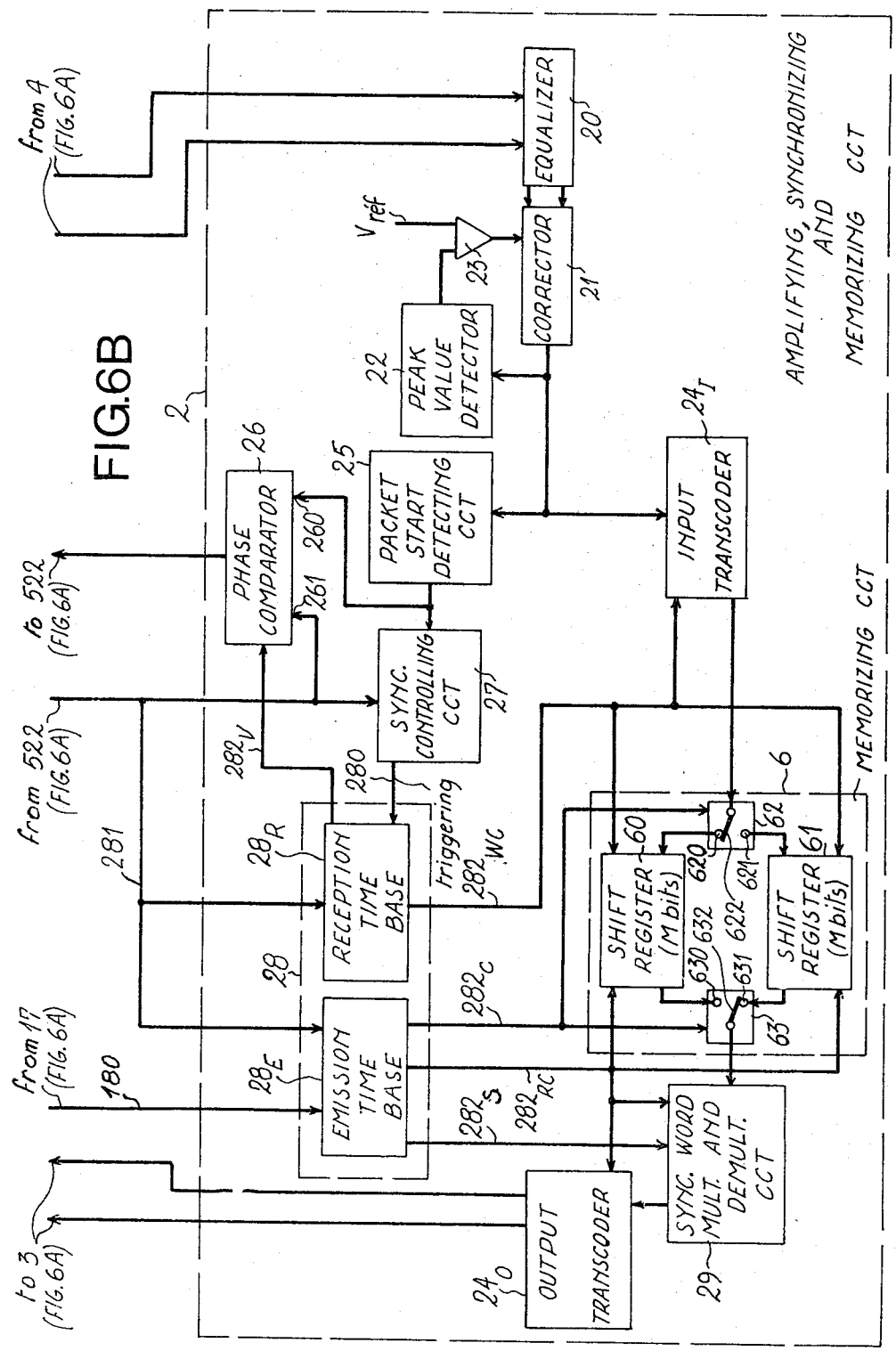

HALF-DUPLEX DIGITAL TRANSMISSION SYSTEM

BACKGROUND OF THE INVENTION

1. Field of the Invention

The present invention relates to a half-duplex digital transmission system having two terminal stations linked by a two-wire line including bidirectional repeaters.

2. Description of the Prior Art

Half-duplex digital transmission systems are disclosed in the German Patent Application No. 2,040,401 and Canadian Pat. No. 1,081,816 and the article by P. Hirschmann and K. Wintzer entitled "Design concept and features of digital subscriber sets", published in "International Zurich Seminar on digital communications", pages D1.1 to D2.4, Zurich, Switzerland, Mar. 7-9, 1978.

Generally speaking, one of the terminal stations is a subscriber digital line concentrator within a telephone switching exchange and the other terminal station is a subscriber terminal such as a digital telephone set.

An encoding and decoding device associated with the telephone set simultaneously emits and receives digital signals which correspond to the encoding of voice signals. The resulting bit rate is for instance equal to 64 kbits/s. This corresponds to PCM encoding a voice signal sample every 125 μs into an octet.

The half-duplex transmission imposes a digital bit rate in line at least equal to twice the initial one of 64 kbits/s. In other words, each two-wire line conveys packets having at least eight bits along both transmission directions alternately such that each packet occupies a time interval which is less than 125/2 μs. The line bit rate is equal, for example, to 256 kbits/s. As a result, over one half-duplex transmission cycle, which is defined by the temporal difference between the emission of two successive packets from one terminal station, each station emits only one packet and receives only another packet from the remote station.

In accordance with the prior art, a packet is transmitted directly from one station along a two-wire line to the other remote station. During one transmission cycle, a first packet is emitted, in one of the transmission directions, from a first of the stations and received by a second station; then a second packet is transmitted from the second station having just received the first packet and is received by the first station. Consequently, in the repeaters inserted on the two-wire line, all the amplifying means related to the first packet transmission direction are connected to the two line sections adjacent to the repeater; then the amplifying means related to the opposite, second packet transmission direction are connected to the two adjacent line sections and so on.

Due to this, for a given bit rate and a given format of the packets conveyed along the line, the range of the two-wire line, i.e. its maximum length is limited by the half-duplex transmission cycle duration imposed by the "master" station, in this case the line concentrator. Put another way, this means far-flung subscriber terminals cannot be linked up to the concentrator via very long digital two-wire lines.

OBJECT OF THE INVENTION

The principal object of the present invention is to provide a half-duplex digital transmission system in which the propagation time between the emission of a first packet from one terminal station and the reception in the same station of a second packet emitted by a second terminal station in response to the reception of the first packet is higher than the half-duplex transmission cycle duration in the terminal stations. The half-duplex transmission conditions between two adjacent repeaters or between a repeater and a station are nevertheless retained.

SUMMARY OF THE INVENTION

In accordance with the above object, there is provided a half-duplex digital transmission system having two digital packet emitting and receiving terminal means connected through a two-wire transmission line including bidirectional repeaters, each of said repeaters comprising:

two means for amplifying the digital packets received along the two opposite transmission directions on said line, respectively, and means for switching alternately one of said two amplifying means, then the other amplifying means to the two line sections adjacent to said repeater during a half-duplex transmission cycle.

The half-duplex digital transmission system is characterized in that at least one of said repeaters also comprises:

means for memorizing each packet received and amplified along one of said transmission directions, thereby retransmitting it after a delay of at least two times the duration of a packet, reception timing means triggered by the start of each packet received along said transmission direction for controlling the writing of said packet in said memorizing means, and emission timing means triggered by the start of each amplified packet received along the other transmission direction for controlling the readout of the packet which is memorized during the preceding half-duplex transmission cycle, after a predetermined hold time following the reception of a packet along said other transmission direction.

The fact that the packets are memorized, i.e. delayed along one of the transmission directions in at least one repeater, enables a two-wire subscriber line to be longer than that of prior art. Indeed, the line length no longer depends on the half-duplex transmission cycle duration since the packets are memorized in repeaters as many times as may be required for two packets to be half-duplex transmitted in the opposite direction between two adjacent repeaters, at least throughout a half-duplex transmission cycle having a predetermined duration T.

According to the prior art, the sum of the repeater transit times, the propagation times between two adjacent repeaters and between a repeater and a terminal station and the hold time required by the switching in a station must always be less than T/2. If it is supposed that the number of repeaters in a line is at the most equal to that for which the line sections between two adjacent repeaters have a maximum range which is restricted chiefly by the attenuation per length unit of the line, then clearly for a given value of T the number of line sections is very limited; the number of line sections is quite small for short half-duplex transmission cycle duration. On the other hand, in accordance with the invention, only the length of the line sections is limited by the cycle duration T. In other words, for a given value of T, a transmission line according to the invention can be considerably longer than the case of prior art, or for a given line length, the cycle duration T can be shorter. It naturally follows that for a given line length and a given value of T, the maximum length of the packets can be greater than that, in accordance with prior art. The latter remark indicates that for a given digital bit rate employed in the stations, there is no need to resort to a concentrator comprising at the emission end means for increasing the digit in-line rate with respect to that used in the station; this is in contrast with the German Patent Application No. 2,040,401.

In accordance with a first embodiment of the invention, the memorizing means of a repeater comprises two parallel shift registers, each having a number of stages equal to at least the maximum number of useful information bits in a packet. Input switching means alternately applies the received and amplified packets propagating in the first transmission direction to the inputs of the shift registers and output switching means alternately delivers the memorized packets from the outputs of the shift registers.

In accordance with a second embodiment of the invention, the memorizing means in a repeater comprises a random access memory having a number of elementary cells equal at least to the maximum number of useful information bits in a packet. Addressing means controlled by the reception timing means writes each packet received along said transmission direction in the random access memory in response to detection of the start of each received packet. Addressing means controlled by the emission timing means successively reads-out the cells of the random access memory in response to an order identical to that used for writing, once a packet from said other transmission direction has been received and a hold time has elapsed.

BRIEF DESCRIPTION OF THE DRAWING

Other advantages of the present invention will be apparent from the following more particular description of preferred embodiments of the invention as illustrated in the accompanying drawing, in which:

FIGS. 6A and 6B are a block diagram of a first type repeater with memorizing means according to the first embodiment.

FIGS. 1A and 1B are diagrams of a half-duplex digital transmission system in accordance with the prior art. A two-wire line L links two terminal stations A and B and is divided into N+1 sections $S_1$ to $S_{N+1}$. Each line section $S_n$, where the integer n varies from 1 to N+1, is linked to the following section by a repeater $R_n$ of the so-called second type. The last section $S_{N+1}$ is linked to the station B.

To avoid overloading the diagrams, reference is made hereinafter, unless otherwise stated, to a transmission line which has N+1=3 sections $S_1$, $S_2$ and $S_3$ and N=2 repeaters $R_1$ and $R_2$.

Figure 1A:
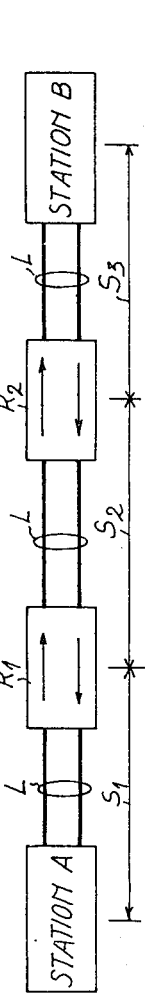
FIGS. 1A and 1B are diagrams of a half-duplex transmission system having two conventional repeaters of the second type, i.e. with retransmission of a packet after a transit time, and the corresponding temporal diagram in accordance with the prior art.
Figure 1B:
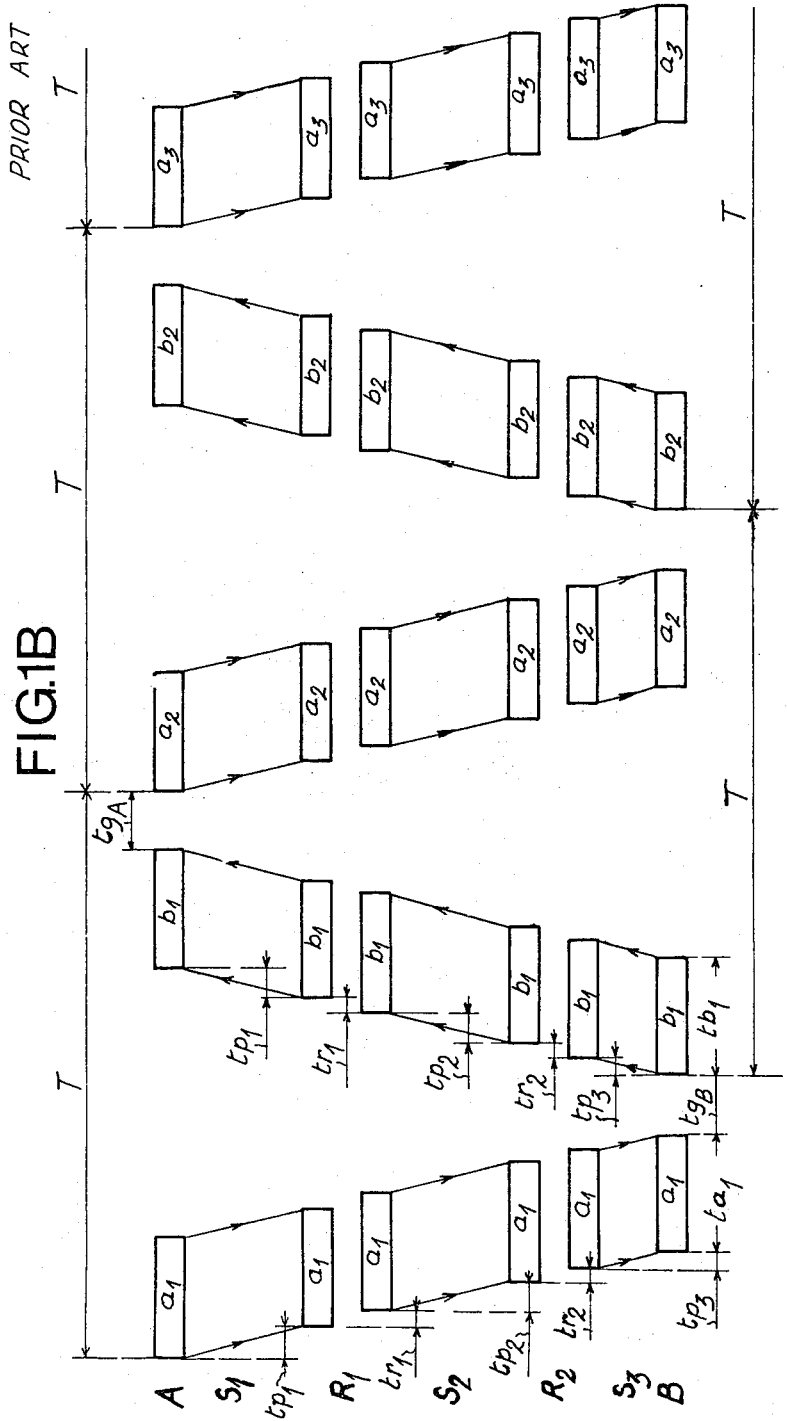

One of the stations, such as the station A, is considered as being the "master" station since it imposes the half-duplex transmission cycle duration between the two stations. The duration T of one transmission cycle is defined as the interval between the emission start time of a packet such as $a_1$ in the so-called "forward" transmission direction—from master station A towards so-called "slave" station B—and the emission start time of the following packet $a_2$. Between these two times, the station A receives a packet $b_1$ transmitted by the slave station B in the opposite transmission direction, i.e. in the backward direction from the station B to the station A. In addition to this condition, the half-duplex transmission implies, according to the prior art, that a second packet $a_2$ is emitted by the master station A, during a transmission cycle T once the first packet $a_1$ has been transmitted by the master station A and received by the slave station B and a first packet $b_1$ has been transmitted by the slave station B and received by the master station A, as shown in FIG. 1B. As a result, the cycle duration T is governed by the following inequality:

$$T \geq 2(tp_1 + tr_1 + tp_2 + tr_2 + tp_3) + ta_1 + tb_1 + tg_A + tg_B$$

where $tp_n$ is the propagation time in the section $S_n$, $tr_n$ is the packet transit time through a repeater $R_n$, $ta_1$ and $tb_1$ are the lengths of the time intervals which are occupied by the packets $a_1$ and $b_1$, and $tg_A$ and $tg_B$ are the so-called hold times which are required in the terminal stations A and B between the reception end of a packet $b_1$, resp. $a_1$, and the emission start of the following packet $a_2$, resp. $b_1$.

The conditions inherent in the packet processing in the stations, which determine the duration of a half-duplex transmission cycle T and the digit rate of the packets as well as the format thereof are not taken into consideration hereinafter. In this respect, in accordance with the above example for the prior art, a packet a or b can be initially processed in a terminal station with a bit rate of 64 kbits/s. Each packet conveys, for instance, 10 bits over a transmission cycle T having a duration of 125 μs and comprises a data field such as an informatory octet. The line L is then a subscriber telephone line, the station B is a subscriber terminal and the station A a time division digital exchange or, more exactly, the data terminal equipment within this exchange which serves the subscriber telephone line. The line digit rate is roughly equal to half the initial rate. For example, the digital rate for 10-bit packets is equal to 256 kbits/s. Each packet comprises a synchronization bit which is intended for synchronizing the repeaters and station B and a state bit which indicates whether the data field, which succeeds the first bit and comprises the informatory octet, relates to the information—speech or data—or to the signalling.

DESCRIPTION OF THE PREFERRED EMBODIMENTS

The present invention, generally speaking, considers packets having a variable number of bits, in which a predetermined word indicates the variable number of bits of the informatory field which is always less than a predetermined number. Each packet can comprise, in addition to a synchronization word, predetermined words signalling the start and end of a packet. In the following, it will be supposed that the packets $a_1$, $a_2$, $a_3$ ... emitted by the master station A and the packets $b_1$, $b_2$, $b_3$ ... emitted by the slave station B occupy time intervals having various durations $ta_1$, $ta_2$, $ta_3$ ... and $tb_1$, $tb_2$, $tb_3$ ... respectively and that these times cannot exceed a maximum duration $t/2$.

Hold times $tg_A$ and $tg_B$, in relation to the terminal stations A, B, and the transit times $tr_n$, in relation to repeaters $R_n$ laid down by the half-duplex switching are imposed by the organization of the master station A and can be different from each other. It will also be noted that, after receiving a packet b, the master station A can only emit a new packet a after a time lapse $tg_A + tg_m$, where $tg_m$ is an idle time. In practice, $tg_m$ is small and often close to zero. $tg_s$ (hold time in the stations) is indicated as $tg_s = tg_A + tg_B + tg_m$. Still in relation to the general case, transit times $tr_n$ in the repeaters, due to packet retransmission in one and the same direction, and hold times $tg_n$ in the repeaters, due to conditions imposed by the half-duplex switching in relation to a line section, are different although the amplifying circuits and eventually regeneration circuits of repeaters may be analogous and consequently the transit of the amplifying circuit and hold times may be equal. In the following relationship, the indices A, B, n are added to these parameters to indicate a difference between the repeaters and the stations.

The previous inequality, in light of the above definitions, for a line having N repeaters $R_1$ to $R_N$, becomes:

$$T \geq 2 \left[ \sum_1^N tr_n + \sum_1^{N+1} tp_n \right] + t + tg_s \qquad (1)$$

As already pointed out, for a line L having a given length 1, the number N of repeaters $R_n$ is determined by the equation:

$$N = [1/1_{max}] - \epsilon$$

where $1_{max}$ is the maximum length of a section beyond which the attenuation introduced by the section is too high for the signal to be detected, amplified and regenerated suitably in the following repeater. The square brackets indicate a whole number for the quotient of the division operation. $\epsilon$ is equal to 1 when the remainder of the $1/1_{max}$ division is zero, and is equal to 0 should the opposite be the case. In FIGS. 1 to 5, the lengths of line sections $S_1$ and $S_2$ are preferably taken as being equal to $1_{max}$ and the length of $S_3$ is less than $1_{max}$, for example $1_{max}/2$.

In FIG. 1B, for a line L having a length 1, if relationship (1) is not satisfied then the half-duplex transmission of packets cannot go ahead. This is the case especially when line L is too long, i.e. when $$\sum_1^{N+1} tp_n = \sum_1^{N+1} l_n/v_n$$

where $l_n$ is the length of a section $S_n$ and $v_n$, the wave velocity (phase velocity) in the section $S_n$ of line L. However, this may also stem from the fact that, for a given line L, line digit rate D of the M-bit packets is too slow, i.e. if $t/2 = M/D$ is too high.

FIGS. 2 to 5 are diagrams of half-duplex digital transmission systems embodying the invention, in which condition (1) is not satisfied. In other words, the duration T of the half-duplex transmission in the systems of FIGS. 2–5 satisfies the following inequality:

$$T < 2 \left[ \sum_{n=1}^{n=N} tr_n + \sum_{n=1}^{n=N+1} tp_n \right] + t + tg_s \qquad (2)$$

The systems illustrated in accordance with this invention are described herebelow in a decreasing order of the cycle times T thereof. It is assumed for FIGS. 2B to 4B that a packet a emitted by the station A is received directly by the station B, i.e. as in the prior art, only through amplification in the repeaters $R_1$ and $R_2$. On the other hand, afer receiving a packet a, the station B emits a packet b in the backward direction which is not directly transmitted to the station A, but is delayed in at least one of the repeaters. This delay is imposed by a so-called first type repeater—i.e. comprising packet memorizing and delaying means—by storing the packet b until the next cycle the delay is not due to routing the packet b directly during the remaining cycle time which is given $T - (tp_1 + tr_1 + tp_2 + tr_2 + ta_1 + tg_B)$, as shown in FIG. 1B. For instance, as illustrated by short-dashed lines in FIG. 2B, should packet $b_1$ not be memorized during $tm_2$ in first type repeater $R_2$, then it would be totally or partly received at the end of the first cycle which precedes the emission start of following packet $a_2$ from the station A. Since a hold time $tg_A$, no matter how short it may be, is required for switching transmission directions in station A, the direct reception of packet $b_1$ is out of the question.

Figure 2A:
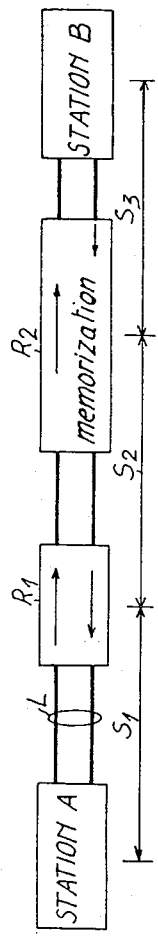
FIGS. 2A and 2B are diagrams, according to the invention, of a half-duplex transmission system having a repeater of first type, i.e. including packet memorizing means, and a repeater of second type, and the corresponding temporal diagram.

To obviate this impossibility, the repeater $R_2$ in FIG. 2 once it receives the second packet $a_2$ amplifies and then memorizes the packet $b_1$ during a memorization time $tm_2$ and retransmits packet b, in the backward direction toward the station A, via so-called second type repeater $R_1$, i.e. a repeater that does not include memorizing and delaying means. Consequently, the emission start of the packet $b_1$ from the repeater $R_2$ can only take place after a hold time $tg_2$ following the reception end of the packet $a_2$ in the repeater $R_2$. The same holds true, in the other examples, each time a first type repeater has to retransmit a packet along a line section after having received a packet along the opposite direction on this section.

In keeping with the above criteria, for the insertion of repeater $R_2$ memorizing a packet such as $b_1$ to be necessary, relationship (2) must be satisfied for $N = 2$; in the event conventional half-duplex transmission of two packets a, b between A and $R_2$ is adopted, the following relationship must be confirmed:

$$tp_1 + tr_1 + tp_2 + ta + tg_2 + tb + tp_2 + tr_1 + tp_1 + tg_A \leq T$$

or $$2(t_{p1}+t_{p2})+2t_{r1}+t+t_{g2}+t_{gA} \leq T \quad (3)$$

This condition implies, a fortiori, that the half-duplex transmission between $R_2$ and B has been performed. The amplification and memorization time for a packet b in repeater $R_2$ is given by the relationship:

$$t_{m2}+t_{r2} \geq T+t_{g2}-(t_{r2}+t_{p3}+t_{gB}+t_{p3}) \quad (4)$$

The sign > is applicable especially when idle time $t_{gm}$ has a value other than zero.

Figure 3A:
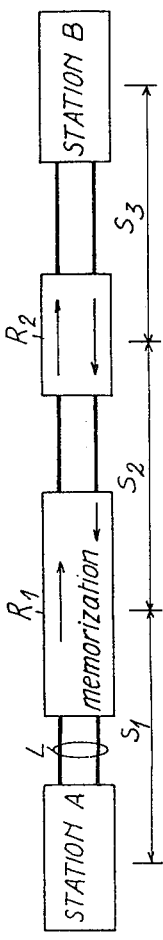
FIGS. 3A and 3B are diagrams, according to the invention, of another half-duplex transmission system having a first type repeater and a second type repeater, and the corresponding temporal diagram.
Figure 3B:
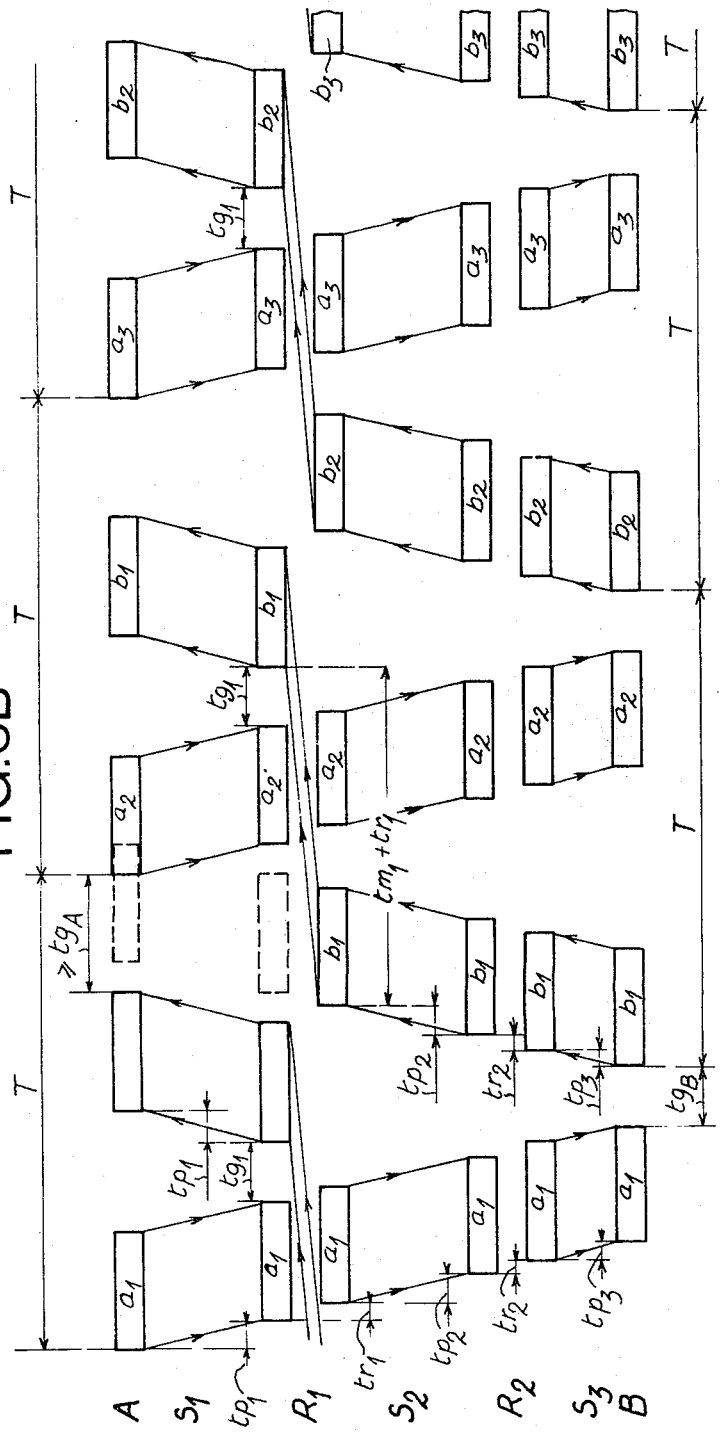

FIGS. 3A and 3B are illustrations for the case of transmitting a packet b directly, with no storage, across a repeater $R_2$ which is of the second type; between the slave station B and a repeater $R_1$ which is of the first type; after packet b has been amplified and stored for a time $t_{m1}$ in the repeater $R_1$, it is transmitted between the repeater $R_1$ and the master station A. This implies that relationship (2) is satisfied for $N=2$ and that, in relation to the direct conventional half-duplex transmission between $R_1$ and B, the following relationship is confirmed:

$$t_{p2}+t_{r2}+t_{p3}+t_a+t_{gB}+t_b+t_{p3}+t_{r2}+t_{p2}+t_{g1} \leq T$$

or $$2(t_{p2}+t_{p3})+2t_{r2}+t+t_{g1}+t_{gB} \leq T \quad (5)$$

Half-duplex transmission between $R_1$ and A is, a fortiori, possible. The amplification and memorization time for a packet b in the repeater $R_1$ is as follows:

$$t_{m1}+t_{r1} \geq T+t_{g1}-(t_{r1}+t_{p2}+t_{r2}+t_{p3}+t_{gB}+t_{p3}+t_{r2}+t_{p2}) \quad (6)$$

By taking a general case, for a first type repeater $R_n$ of rank n to memorize a packet b in a half-duplex line having N repeaters, N-1 of which amplify solely the packets and are of the second type, the relationship (2) and the following relationship must be satisfied:

$$sup\left[\left(2\sum_{k=1}^{k=n} t_{pk} + 2\sum_{k=1}^{k=n-1} t_{rk}\right),\right. \quad (7)$$

$$\left.\left(2\sum_{k=n+1}^{k=N+1} t_{pk} + 2\sum_{k=n+1}^{k=N} t_{rk}\right)\right] +$$

$$t + t_{gn} + sup(t_{gA}, t_{gB}) \leq T$$

The term "sup" indicates the higher value of the two expressions in square brackets. Repeater $R_n$ then memorizes a packet b during a time such that:

$$t_{mn} \geq T + t_{gn} - 2\left[\sum_{k=n+1}^{k=N+1} t_{pk} + \sum_{k=n}^{k=N} t_{rk}\right] - t_{gB} \quad (8)$$

Figure 4A:
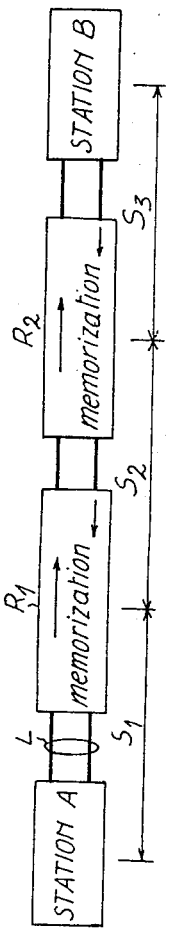
FIGS. 4A and 4B are diagrams, according to the invention, of a half-duplex transmission system having two first type repeaters with memorizing means along the same transmission direction, and the corresponding temporal diagram.

FIG. 4 is an illustration of a half-duplex transmission line with two repeaters $R_1$ and $R_2$ which are of the first type, each of which memorizes a packet b. A packet, such as $b_1$, is transmitted in the backward direction by the slave station B and is amplified and memorized in the repeater $R_2$ throughout a time $t_{r2}+t_{m'2}$, during which time the repeater $R_2$ amplifies the packet $a_2$ delivered by the repeater $R_1$ and retransmits it to the station B. Once packet $a_2$ has been fully received at repeater $R_2$, followed by a hold time $t_{g2}$ required for switching the transmission directions in relation to the section $S_2$, the repeater $R_2$ delivers the packet $b_1$ along the section $S_2$ to the repeater $R_1$. The repeater $R_1$ amplifies and memorizes the packet $b_1$ throughout time $t_{r1}+t_{m'1}$, during which time the repeater $R_1$ amplifies the following packet $a_3$ delivered from the station A and retransmits it to the repeater $R_2$. Once packet $a_3$ has been fully received at repeater $R_1$, followed by a hold time $t_{g1}$ required for switching transmission directions in relation to the section $S_1$, the repeater $R_1$ delivers the packet $b_1$ along the section $S_1$ to the master station A.

Figure 4B:
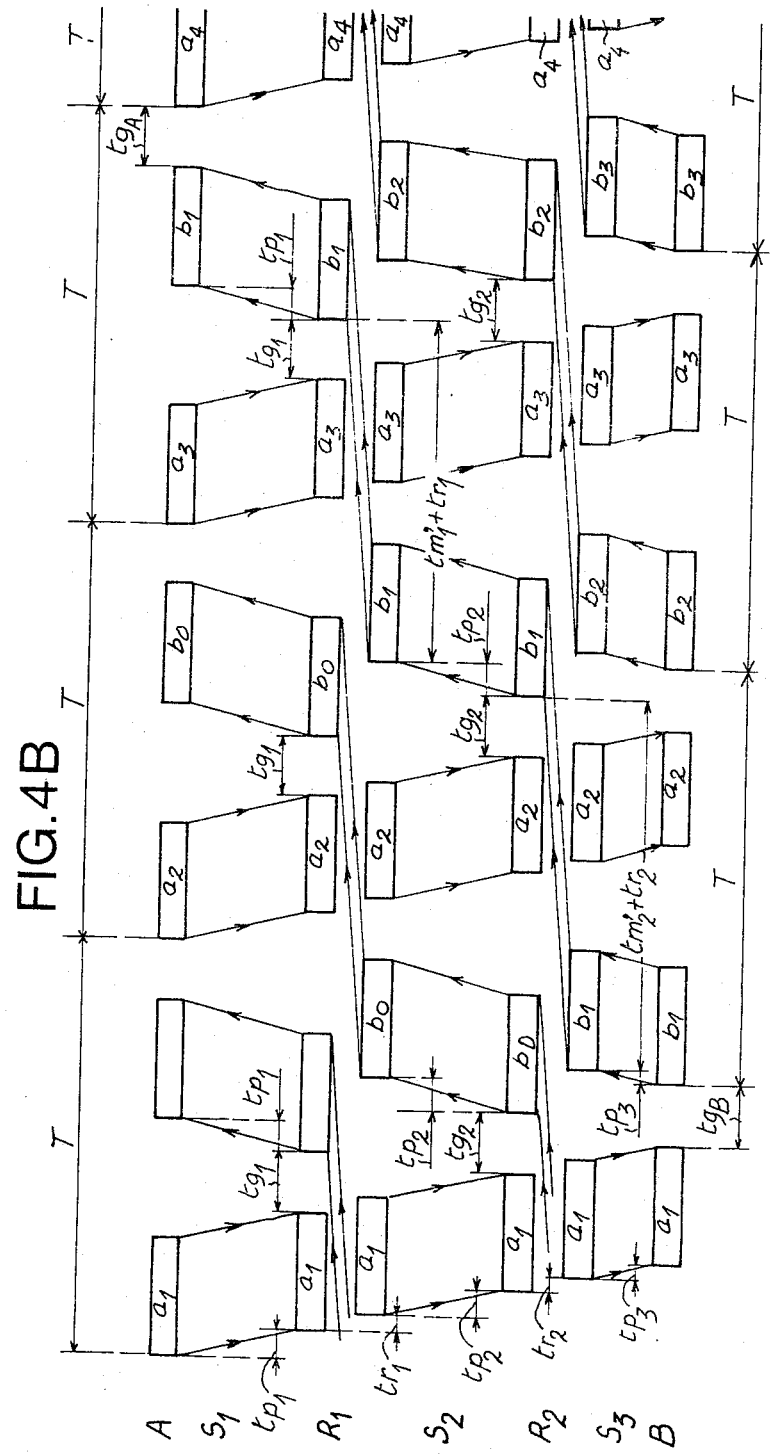

The following packet $a_4$ is transmitted from the station A at least after a hold time $t_{gA}$ following the end of reception of the packet $b_1$. In FIG. 4B, it is indicated that the transmission of a packet $b_1$ between the station B and the station A takes about 2T, whilst in FIGS. 2B and 3B, it takes around T and, in the prior art (FIG. 1B), about T/2.

In addition to relationship (2), for the transmission to take place as per FIG. 4, the following relationship must be satisfied in relation to a section $S_1$ or $S_2$ having a maximum length $l_{max}$ which imposes a maximum propagation time $tp_{max}$:

$$2 tp_{max}+t_{g1} \text{ or } 2+t_{gA} \text{ or } 1+t \leq T \quad (9)$$

The half-duplex transmission condition for a line section, such as section $S_3$ having a length shorter than $l_{max}$ is, a fortiori, satisfied. Although the equality (9) may be satisfied, the half-duplex transmission is possible for a line L having a length $l > l_{max}$, in comparison with the German Patent Application No. 2,040,401.

The storage, i.e., memorization times $t_{m'2}$ and $t_{m'1}$ of a packet b in first type repeaters $R_2$ and $R_1$ are given by previous relationship (4), namely:

$$t_{m'2} \geq T+t_{g2}-(2t_{r2}+t_{p3}+t_{gB}+t_{p3}) \quad (4)$$

and the following relationship:

$$t_{m'1} + t_{r1} \geq 2T+t_{g1}-(t_{r1}+t_{p2}+t_{r2}+t_{p3}+t_{gB}+t_{p3}+t_{m'2}+t_{r2}+t_{p2})$$

Naturally, two repeaters or more having memorizing and delaying means, such as $R_1$ and $R_2$ of FIG. 4, are inserted when the relationship (7) regarding a repeater having memorizing and delaying means (FIG. 2 or 3) is not satisfied.

It will be noted, in keeping with FIGS. 2, 3 and 4, that the half-duplex transmission conditions are respected if the order of station A and B is inversed, i.e., one station taking the place of the other and vice versa. In this case, according to FIG. 2 or 3, a packet a is transmitted by station A to station B, going through memorization in one of first type repeaters $R_2$ or $R_1$, whilst a packet b is transmitted directly from station B to station A. In relation to FIG. 4, for the latter case, a packet a is transmitted by station A to station B, going through two memorization operations in repeaters $R_1$ and $R_2$.

Figure 5A:
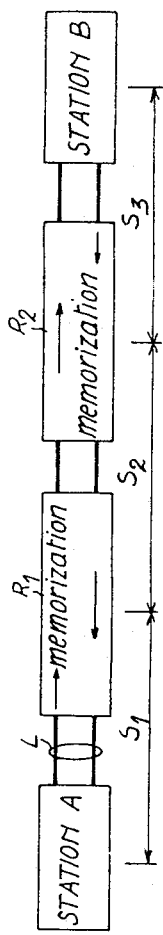
FIGS. 5A and 5B are diagrams according to the invention, of a half-duplex transmission system having two first type repeaters with memorizing means in the two transmission directions respectively, and the corresponding temporal diagram.
Figure 5B:
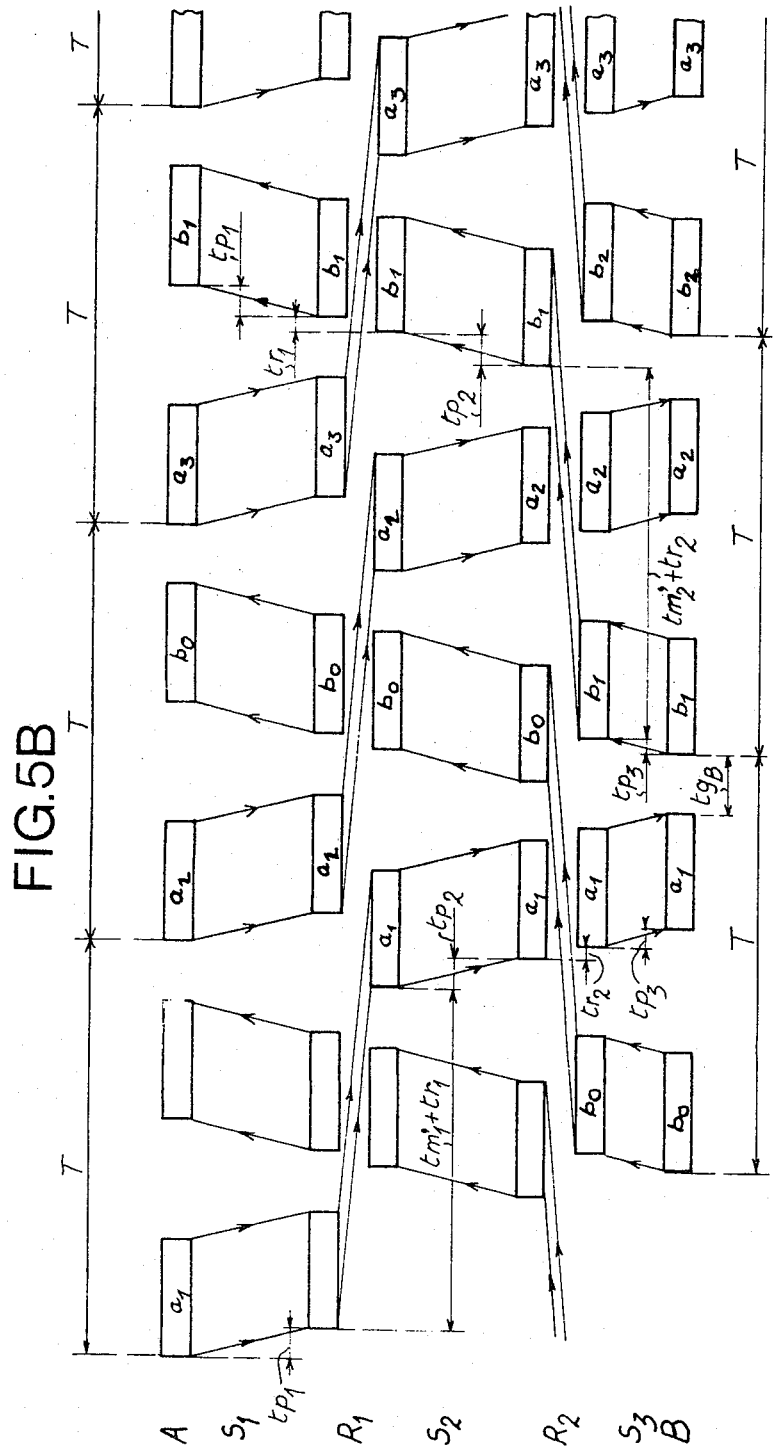

When there is double memorization, as in FIG. 4, one memorization operation can take place in one transmission direction—the forward direction for instance—in one of the first type repeaters, such as $R_1$, during time $t_{m'1}$; another memorization operation takes place in the other, first type of repeater, such as $R_2$, in the other transmission direction—the backward direction for instance—during time $tm'_2$ as shown in FIGS. 5A and 5B.

In all of these embodiments, the condition for half-duplex transmission along a section between two adjacent repeaters or between a repeater and a terminal station is always respected, i.e. the reception of a packet a or b is always followed by the emission of a packet b or a after a time equal at least to a hold time tg. When the repeater includes memorizing means in the transmission direction, the memorization time tm is always more than at least two times the duration T/2 of a packet.

Generally speaking, in a half-duplex digital transmission system comprising N repeaters and N+1 line sections between two terminal stations, P first type repeaters ($P \leq N$) are provided, each of which comprises means for memorizing a packet in one transmission direction. The first type of repeaters are set out such that P-Q repeaters memorize packets propagating in one transmission direction and Q repeaters memorize packets propagating in the other transmission direction, where $0 \leq Q \leq P$. The integral number P representing the first type repeaters and the memorization times tm thereof are based on criteria analogous to those defined for the straightforward embodiment examples described above.

With reference now to FIGS. 6A and 6B, is shown a preferred lay-out of a bidirectional repeater R of a first type embodying the invention which enables a packet transmitted along one transmission direction to be memorized. It will be assumed that this repeater can be the repeater $R_1$ of FIGS. 3 and 5 or the repeater $R_2$ of FIGS. 2, 4 and 5. On FIG. 6, the "master" station A is to the left and the "slave" station B to the right.

The repeater comprises mainly an amplifying and synchronizing circuit 1 (FIG. 6A) which is assigned to the forward transmission direction and an amplifying, synchronizing and memorizing circuit 2 (FIG. 6B) which is assigned to the backward transmission direction. The circuits 1 and 2 are connected to the station A side line section and station B side line section respectively by two selective hybrid couplers 3 and 4 (FIG. 6A). The repeater comprises also a clock 5.

Each circuit 1, 2 comprises, as regards amplification and regeneration, on the side of station A, resp. on the side of station B, an equalizer 10, 20 which is followed by a loop regulating the amplification gain of the incoming signal. This loop is made up of: a line section corrector 11, 21 which receives the corrected signal and weights the attenuation due to the transmission along the preceding line section; detector 12, 22 which detects the peak value of the signal derived from the corrector 11, 21, and; voltage comparator 13, 23. The comparator compares the output voltage from the detector 12, 22 with a reference voltage $V_{ref}$ to derive a signal current for regulating the gain of the corrector 11, 21.

The output terminal of the corrector 11, 21 is also connected to the input of an input transcoder $14_I$, $24_I$ and to the input of a packet start detecting circuit 15, 25. The transcoder $14_I$, $24_I$ converts the received digits in line code, such as an interlaced bipolar code of order 2, into binary digits. The circuit 15, 25 detects the start of the packet either by comparing the received signal voltage with two predetermined thresholds by means of Schmitt flip-flops, or by comparing the packet start word, should it exist, with a word recorded beforehand. Each time the start of a received packet is detected, the circuit 15, 25 applies the synchronization word of the received packet to input 160, 260 of a phase comparator 16, 26 and to one input of a synchronization controlling circuit 17, 27. Circuit 17 triggers the time base circuit 18 of the circuit 1 via wire 180, while circuit 27 triggers a reception time base circuit $28_R$ of the circuit via wire 280.

The time base circuit 18 of the circuit 1, resp. the unit 28 of the circuit 2 which includes the reception time base circuit $28_R$ and an emission time base circuit $28_E$, is phase locked with the common local clock 5 (FIG. 6A) which is plesiochronous with the digit frequency of the packets received. The clock 5 comprises an oscillator 50 which delivers a clock signal at the high frequency kF and which affords a high stability of approximately $10^{-4}$. The output of the oscillator 50 is connected to a divide-by-k divider 51. The divider 51 transmits the k possible phases of the frequency F, which is equal to the in-line packet digit rate. The k outputs of the frequency divider 51 are connected to the k inputs of two phase selecting circuits 521 and 522 which are assigned to circuits 1 and 2, respectively. The output of the phase selecting circuit 521 of the circuit 2 is connected to a phase-setting input 181 of the time base circuit 18 and to input 161 of phase comparator 16 and a control input of synchronization control circuit 17; the output of circuit 522 is connected via lead 281 to inputs of the time base circuits $28_R$ and $28_E$, to input 261 of the phase comparator 26 and to a control input of the synchronization controlling circuit 27. The output of the comparator 16, 26 is connected to the control input of phase selecting circuit 521, 522 and thus selects that phase amongst k at frequency F in terms of the comparison result for each synchronization word detection. Phase locking on the packets received in each circuit 1, 2 is typically achieved once during reception of at least three packets. The time base circuit 18, 28 thus synchronized makes it possible, after having been triggered by the synchronization controlling circuit 17, 27, to: validate the comparison phase in the comparator 16, 26, via its output wire $182_V$, $282_V$; control at frequency F the decoding of the digits received by the input transcoding circuit $14_I$, $24_I$, via its output wire $182_C$, $282_{WC}$; cancel the received synchronization word; insert a new synchronization word in a synchronization word demultiplexing and multiplexing circuit 19, 29, via its output wires $182_C$–$182_S$, $282_{RC}$–$282_S$, and encode the packet bits to be emitted in an output transcoder $14_O$, $24_O$, via its output wires $182_C$, $282_{RC}$. The output from the circuit 19, 29 is connected to the digital input of the output transcoder $14_O$, $24_O$ which converts the packet to be emitted in binary code into line code. As can be seen from FIGS. 6A and 6B respectively, the time-base circuit 18 of the circuit 1 transmits along the wire $182_C$ a clock signal at frequency F whose having a phase selected by the comparator 16, and the time base circuits $28_R$ and $28_E$ of the circuit 2 transmit along wires $282_{WC}$, $282_{RC}$ clock signals at frequency F, having a phase is selected by the comparator 26.

As shown on FIGS. 6A and 6B, the circuits 1 and 2 differ in that circuit 1, amplifies and resynchronizes packet a received from station A and retransmits it directly to station B, whereas circuit 2, amplifies and synchronizes packet b received from station B but also retransmits it to station A after a delay equal to memorization time tm. As already stated, this delay is dependent on the lay-out of the transmission line, i.e. on its length and the number of repeaters, and on the position assigned to the repeater in the line.

In the circuit 1 (FIG. 6A), the output of the data input transcoder $14_I$ is connected directly to the digital input of synchronization word demultiplexing and multiplexing circuit 19. In the circuit 2 (FIG. 6B), the data output of the input transcoder 24 is connected to the digital input of synchronization word demultiplexing and multiplexing circuit 29 via a memorizing circuit 6.

According to the embodiment illustrated in FIG. 6B, the memorizing circuit 6 comprises two shift registers 60 and 61, each having a number of stages preferably equal to the maximum number M of useful information bits of a packet. The bits of a synchronization word are reconstituted in the multiplexing and demultiplexing circuit 29.

The digital inputs of the registers 60, 61 are connected to two stationary contacts 620, 621 of a two-position input switch 62, respectively. The digital outputs of the registers 60, 61 are connected to two stationary contacts 630, 631 of a two position output switch 63, respectively. The moving contact 622 of the input switch 62 is connected to the output terminal of the input transcoder $24_I$. The moving contact 632 of the output switch 63 is connected to the digital data input terminal of the synchronization word demultiplexing and multiplexing circuit 29.

Moreover, the time base circuit 18 of circuit 1 (FIG. 6A) synchronizes the decoding at the input of circuit 1 and the encoding at the output of circuit 1 in terms of the start of the packet received from station A. For these reasons, the clock frequency is transmitted on the wire $182_C$ from the time base circuit 18 to both input transcoder $14_I$ and output transcoder $14_O$; time base circuit 18, via output lead $182_S$ thereof, controls the synchronization word cancelling and insertion. On the other hand, in reference to FIGS. 2 to 5, the time base circuit 28 of the circuit 2 (FIG. 6B) must control the retransmission of a packet b to station A after a hold time tg which follows reception of a packet a from station A along the same line section; as a result, the emission of a packet b from the circuit 2 is triggered by detecting the start of a packet a in the circuit 17. The reception of a packet b in the circuit 2 does not, however, control the emission of a packet b from the circuit 2, unlike the case of the circuit 1.

For these reasons, the time base circuit 28 of the circuit 2 is divided into a reception time base segment $28_R$ and an emission time base segment $28_E$. Both of segments $28_R$ and $28_E$ are locked in phase with packets b transmitted from station B by means of the phase locked loop made up of circuits 26 and 522. The reception time base circuit $28_R$ is triggered, via output wire 280 of the synchronization controlling circuit 27, once the start of a received packet b has been detected. After triggering, the reception time base circuit $28_R$ transmits the packet writing clock frequency throughout the maximum duration of a packet b. The packet clock frequency is transmitted via output wire $282_{WC}$ to the registers 60, 61 as well as to input transcoder $24_I$. After triggering circuit $28_R$ validates the comparison in the phase comparator 26, via output wire $282_v$. The emission time base circuit $28_E$ is triggered, via output wire 180, by the start of packet a, as detected by the circuit 17. After triggering and elapse of a hold time tg, the time base circuit $28_E$ transmits, via wire $282_{RC}$, the packet reading clock frequency to the registers 60, 61, the output transcoder $24_O$ and the synchronization word multiplexing and demultiplexing circuit 29. The circuit 29 receives the order for cancelling and inserting the synchronization word in the corresponding field of the packet under the control of the emission time base $28_E$, via wire $282_S$, in a similar manner to the control of the circuit 19 by the time base 18 in the circuit 1, via wire $182_S$.

In addition, it will be noted that the presence of two shift registers 60 and 61 in the circuit 2 is essential for receiving and emitting packets which do not follow one another and are not synchronous. Indeed, as shown for example in FIGS. 2B, 4B and 5B, a repeater such as repeater $R_2$, emits a packet $b_1$ towards station A whilst it is receiving the following packet $b_2$ from station B. Consequently, the switching operations in input and output switches 62 and 63 are controlled in opposition by the emission time base $28_E$, via wire $282_C$. Naturally, these switching operation are controlled by the emission time base circuit $28_E$ until the circuit 1 emits a packet, preceded always by the reception in the circuit 2 of a packet.

Figure 2B:
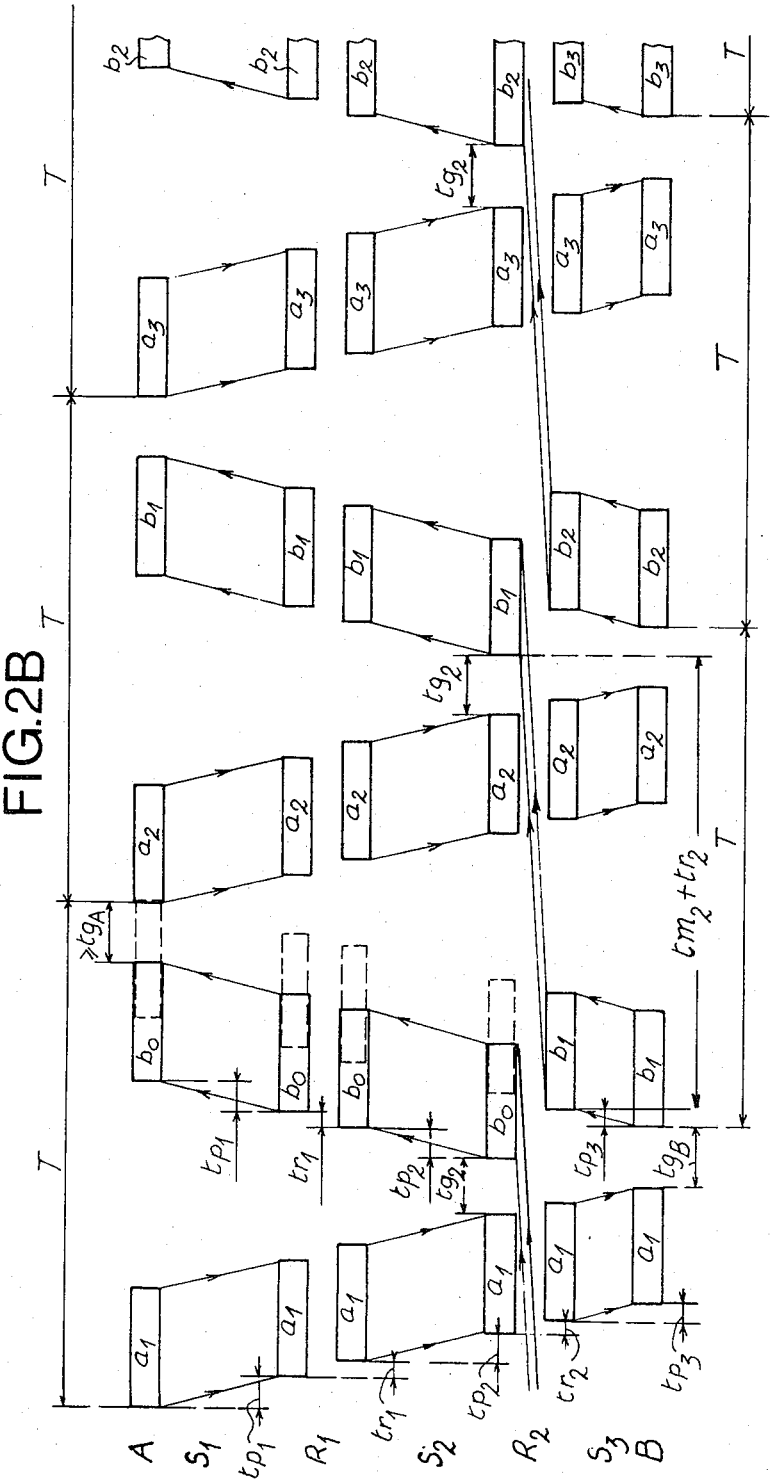

With reference still being made to FIGS. 2B, 4B and 5B, once the start of a packet such as $a_2$ has been detected by the circuits 15 and 17 in circuit 1, which is signalled to the emission time base circuit $28_E$ via wire 180, the emission time base circuit $28_E$ controls the switches 62 and 63 at a time occurring before or equal to t/2+tg. Thereby moving contact 632 of the output switch 63 is connected to the stationary contact 630, which corresponds to shift register 60 having memorized the packet $b_1$, and moving contact 622 of the input switch 62 is connected to the stationary contact 621 which corresponds to the other shift register 61. The packet $b_1$ is read register 60 at the clock frequency which is transmitted on the wire 282; read in to register 60 is synchronous with the start of packets b. The following packet $b_2$ is supplied to register 61 at the clock frequency which is transmitted on the wire $282_{WC}$; read in to register 61 is synchronous with the start of packets b. For the following cycle, i.e. after T+t/2+tg following the reception of the start of the packet $a_2$, the emission time base 28 inverts the positions of the moving contacts 622 and 632 from the positions shown in FIG. 6B. The packet $b_2$ is read into the register 61, after t/2+tg following the detection of the packet $a_3$, and the packet $b_3$ is supplied to the other register 60. In the present paragraph, tg refers to the repeater hold time, i.e. $tg_1$ or $tg_2$ for repeaters $R_1$ or $R_2$ as per FIGS. 2 to 5.

Each hybrid coupler 3, 4 comprises a transformer 30, 40 which is suitably adapted to the two-wire line section, and a bipolar switch 31, 41. The primary winding 300, 400 of transformer 30, 40 is connected to the line section terminals, whereas the terminals of the secondary winding 301, 401 are connected to the two moving contacts 310, 410 of the bipolar switch 31, 41, respectively. Two bipolar contacts $311_1$ and $312_1$ of the switch 31 are connected to the two input terminals of the equalizer 10, and two bipolar contacts $311_2$ and $312_2$ of the switch 31 are connected to the two output terminals of the output transcoder $24_O$. Likewise, two bipolar contacts $411_1$ and $412_1$ of the other switch 41 are connected to the two output terminals of the output transcoder $14_O$ and two bipolar contacts $411_2$ and $412_2$ of the switch 41 are connected to the input terminals of the equalizer 20.

The switchover of switches 31 and 41 is controlled in synchronism by the time base 18 of circuit 1, via a wire $182_A$. At the beginning of each transmission cycle, with regard to master station A, i.e. when the circuit 1 receives a start of a packet a, switches 31 and 41 are connected via circuit 1 and are set in inverse positions to those illustrated in FIG. 6A. After a time at least equal to t+tr, where tr is the packet transit time in the circuit 1 of the repeater, switches 31 and 41 flip over to the positions shown in FIG. 6A, under the control of the time base circuit 18.

Figure 7:
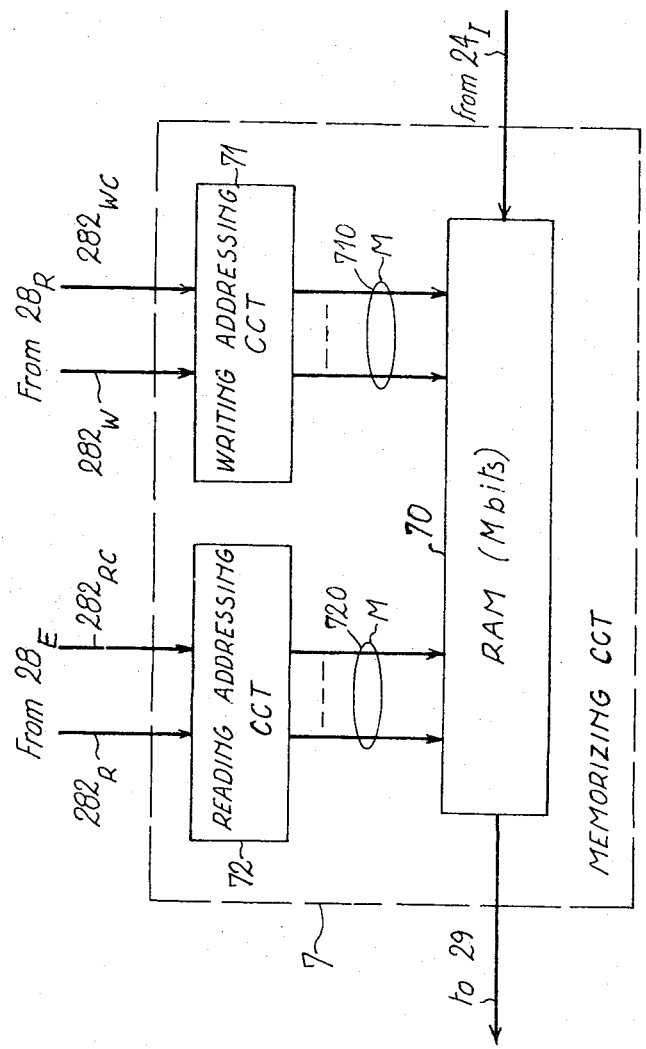
FIG. 7 is a block diagram of the memorizing means according to the second embodiment.

A second embodiment of the memorizing circuit in the circuit 2, depicted in FIG. 7, is made up of a random access memory (RAM) 70 having a number of elementary cells equal to at least the maximum number of useful information bits M in a packet. The useful information bits in a packet are transmitted by the output of the input transcoder $24_I$ and are written in the memory 70 under the control of a writing addressing circuit 71. The latter receives the clock signal from the reception time base circuit $28_R$, via the wire $282_{WC}$ and a writing start signal, via a wire $282_W$, in response to the detection of the start of a packet b in the synchronism controlling circuit 27, via the wire 280. The write addressing circuit 71 includes output M-wire bus 710 for successively addressing cells of the memory 70. The bits of a packet previously stored in the memory 70 are read under the control of a reading addressing circuit 72. The latter, in response to the start of a packet a having been detected in the synchronization controlling circuit 17, via the wire 180, receives the clock signal from the emission time base $28_E$, via the wire $282_R$; and a read start signal via a wire $282_R$. The reading addressing circuit 72 successively addresses the cells of the memory 70 via bus 720, in accordance with the same writing addressing order from the circuit 71.

In this way, with reference to the first type of repeater $R_2$ in FIGS. 2B, 4B and 5B, for example, bits in packet b, can be read from cells in the memory 70 after a time t+tg which follows the reception start of the packet $a_2$; simultaneously the bits of the following packet $b_2$. The bits read from the memory 70 are successively transmitted to the digital input of the synchronization word demultiplexing and multiplexing circuit 29.

Apart from the memorizing circuit, all the other connections and blocks in circuit 2 shown in FIG. 7 are analogous with those already described in reference to FIG. 6.

Finally, it will be noted that a so-called second type repeater in compliance with the invention, not intended for memorizing a packet along one transmission direction, comprises two amplifying and synchronizing circuits which are respectively associated with the two transmission directions and are structured in a similar manner to the circuit 1 described in connection with FIG. 6A. A repeater of this nature, such as repeater $R_1$ in FIG. 2 or repeater $R_2$ in FIG. 3, thus comprises two circuits 1, one of which replaces circuit 2 in FIG. 6; two hybrid couplers 3, 4; and a local clock 5.

What I claim is:

1. A half-duplex digital transmission system having two digital packet emitting and receiving terminal means connected through a two-wire transmission line including bidirectional repeaters,
each of said repeaters comprising:
    means for receiving and amplifying digital packets propagating in one transmission direction on said line, and means for receiving and amplifying digital packets propagating in the other transmission direction,
    means for alternately switching the input of the amplifying means in one direction and the output of the amplifying means in the other direction, and means for switching alternately the output and the input of said amplifying means respectively, at least one of said repeaters also comprising: means for storing each received and amplified packet propagating in one of said transmission directions, said packet being stored for a period equal to at least twice the duration of a packet,
    reception timing means triggered by the start of each received packet propagating in said one transmission direction for controlling the writing of said packet in said storing means,
    emission timing means triggered by the start of each received and amplified packet propagating in the other transmission direction for controlling the readout of the packet stored during the preceding half-duplex transmission cycle, the packet being readout after a predetermined hold time following the reception of a packet propagating in said other transmission direction, and means for coupling the readout packet to the line.

2. A half-duplex digital transmission system according to claim 1, wherein the duration T of said half-duplex transmission cycle in said terminal means is less than the following summation:

$$T < 2\left[\sum_{n=1}^{n=N} tr_n + \sum_{n=1}^{n=N+1} tp_n\right] + t + t_{gS}$$

where
    the integer N is the number of said repeaters included in said line,
    $tr_n$ is the packet transit time through said amplifying means of a repeater $R_n$ propagating in a transmission direction for which there is no packet storing in said repeater,
    $tp_n$ is the packet propagation time between two adjacent repeaters $R_n$ and $R_{n+1}$,
    t/2 is the maximum time interval assigned to a packet, and $tg_S$ is the sum of the minimum hold times in said terminal means required for the half-duplex transmission.

3. A half-duplex digital transmission system according to claim 1 or 2 wherein an integral number P of said repeaters are provided, each of the P repeaters comprising said packet storing means and said reception and emission timing means, said storing means of P - Q of said repeaters storing the received packet propagating in one of said transmission directions, and said storing means of Q of said repeaters storing the received packets propagating in the other transmission directions, where O<Q>P.

4. A half-duplex digital transmission system having two digital packet emitting and receiving terminal means connected through a two-wire transmission line including bidirectional repeaters,
each of said repeaters comprising:
    means for receiving and amplifying digital packets propagating in one transmission direction on said line, and means for receiving and amplifying digital packets propagating in the other transmission direction,
    means for alternately switching the input of the amplifying means in one direction and the output of the amplifying means in the other direction, and means for switching alternately the output and the input of said amplifying means respectively, at least one of said repeaters also comprising:

two parallel shift registers, each having a number of stages equal to at least the maximum number of useful information bits in a packet for storing each received and amplified packet propagating in one of said transmission directions, the shift registers storing and delaying each received packet for a period twice the duration of a packet, input switching means for alternately applying said received and amplified packets propagating in said one transmission direction to the inputs of said shift register, output switching means for alternately delivering the memorized packets from the outputs of said shift registers, reception timing means triggered by the start of received packets propagating in said one transmission direction for alternately controlling the writing of said packets in said shift registers, emission timing means triggered by the start of amplified and received packets propagating in the other transmission direction for alternately controlling the readout of each packet which is stored during the preceding half-duplex transmission cycle after a predetermined hold time following the reception of each stored packet propagating in the other transmission direction and for controlling said input and output switching means, whereby, after the reception of a packet propagating in said other transmission direction followed by said hold time, said output switching means are connected to the output of one of said shift registers which is controlled to be readout by said emission timing means, and said input switching means being connected to the input of the other shift register which is controlled for write in by said reception timing means in response to the start of each packet received along said transmission direction, and means for coupling the readout packet to the line.

5. A half-duplex digital transmission system according to claim 4, wherein each of said repeaters comprises a single lock clock, a time base source means for detecting a synchronization word in each received packet propagating in said one and other transmission directions, and means connected to said detection means for locking the time base source to a phase of a single local clock, said time base source synchronously controlling: (a) first means for converting the detected packets in line code into binary code, (b) means for cancelling and inserting said synchronization word, and (c) second means for converting said packets in binary code into line code.

6. A half-duplex digital transmission system according to claim 5, wherein:

said reception timing means controls said first converting means and said emissions timing means controls said cancelling and inserting means and said second connecting means in the propagation transmission direction for which the packets are stored, and the input of said input switching means being connected to the output of said first converting means and the output of said output switching means being connected to the input of said synchronization word cancelling and inserting means.

7. A half-duplex digital transmission system having two digital packet emitting and receiving means connected through a two-wire transmission line including bidirectional repeaters, each of said repeaters comprising:

means for receiving and amplifying digital packets propagating in one transmission direction on said line, and means for receiving and amplifying digital packets propagating in the other transmission direction, means for alternately switching the input of the amplifying means in one direction and the output of the amplifying means in the other direction, and means for switching alternately the output and the input of said amplifying means respectively, at least one of said repeaters also comprising:

a random access memory having a number of elementary cells equal at least to the maximum number of useful information bits in a packet for storing each received packet propagating in one of said transmission directions, whereby each packet supplied to the memory is stored in the memory for a period equal at least to two times the duration of a packet, reception timing means triggered by the start of each received packet propagating in said transmission direction, emission timing means triggered by the start of each received packet propagating in the other transmission direction, addressing means controlled by said reception timing means for writing each received packet propagating in said one transmission direction into said random access memory in response to detection of the start of this received packet, and addressing means controlled by said emission timing means for successively reading from the cells of said random access memory in an order identical to the writing order, the reading being initiated at a delay time following receipt of a packet propagating in said other transmission direction.

8. A half-duplex digital transmission system according to claim 7, wherein each of said repeaters comprises a single clock, a time base source, means for detecting a synchronization word in each received packet propagating in said one and other transmission directions, and means connected to said detection means for locking the time base source to a phase of a single local clock, said time base source synchronously controlling: (a) first means for converting the detected packets in line code into binary code, (b) means for cancelling and inserting said synchronization word, and (c) second means for converting said packets in binary code into line code.

9. A half-duplex digital transmission system according to claim 8, wherein:

said reception timing means controls said first converting means and said emission timing means controls said cancelling and inserting means and said second connecting means in the propagation transmission direction for which the packets are stored, and the input of said input switching means being connected to the output of said first converting means and the output of said output switching means being connected to the input of said synchronization word cancelling and inserting means.

10. A bidirectional repeater for a half-duplex digital transmission system having first and second digital packet emitting and receiving terminal means connected to each other through a two-wire transmission line including at least one of the repeaters, the packets being transmitted in a first direction from the first to the second terminal means, the packets being transmitted in a second direction from the second to the first terminal means, the repeater comprising:
- first and second means for respectively receiving the digital packets propagating in the first and second directions on said line,
- means for alternately switching said first and second receiving means so only one of the receiving means responds to the packets propagating on the line at a time,
- means for storing each received packet propagating in one of said transmission directions, the received packet being stored for a period of at least twice as long as the duration of a packet,
- reception timing means triggered by the start of each received packet propagating in said one transmission direction for controlling the write in of said packet into said storing means,
- emission timing means triggered by the start of each received packet propagating in the other transmission direction for controlling readout from the storing means of the packet stored during the preceding half-duplex transmission cycle, the packet being readout from the storing means after a predetermined hold time following the reception of a packet propagating in said other transmission direction, and
- means for coupling the readout packet to the line.

11. The repeaters of claim 10 wherein the means for storing includes:
- first and second parallel shift registers, each having a number of stages equal at least to the maximum number of useful information bits in a packet for storing each received packet propagating in one of said transmission directions, whereby each packet supplied to the shift register is derived from the shift registers after an interval two times the duration of a packet,
- said switching means including means for alternately applying the received packets propagating along said one transmission direction to the inputs of said shift register,
- output switching means for alternately deriving the stored packets from the outputs of said shift registers,
- the reception timing means including means triggered by the start of packets received along said transmission direction for alternately controlling the writing of said packets into said shift registers,
- the emission timing means including means triggered by the start of received packets propagating in the other transmission direction for alternately controlling the readout of a packet stored during the preceding half-duplex transmission cycle after a predetermined hold time following receipt of a packet propagating in said other transmission direction and for controlling said input and output switching means, whereby after the reception of a packet propagating in said other transmission direction followed by said hold time, said output switching means are connected to the output of one of said shift registers readout of which is controlled by said emission timing means, said input switching means being connected to the input of the other shift register write in of which is controlled by said reception timing means in response to the start of each received packet propagating in said transmission direction.

12. A repeater according to claim 11 further including a single local clock, a time base source, means for detecting a synchronization word in each received packet propagating in said first and second transmission directions, and means connected to said detection means for locking the time base source to a phase of a single local clock, said time base source synchronously controlling: (a) first means for converting the detected packets in line code into binary code, (b) means for cancelling and inserting said synchronization word, and (c) second means for converting said packets in binary code into line code.

13. The repeater of claim 12 wherein:
- said reception timing means controls said first converting means and said emission timing means controls said cancelling and inserting means and said second converting means in the propagation transmission direction for which the packets are stored, and
- the input of said input switching means being connected to the output of said first converting means and the output of said output switching means being connected to the input of said synchronization word cancelling and inserting means.

14. The repeater of claim 10 wherein the storing means includes:
- a random access memory having a number of elementary cells equal at least to the maximum number of useful information bits in a packet for storing each received packet propagating in one of said transmission directions, whereby each packet supplied to the memory is stored in the memory for a period equal at least to two times the duration of a packet,
- reception timing means triggered by the start of each received packet propagating in said transmission direction,
- emission timing means triggered by the start of each received packet propagating in the other transmission direction,
- addressing means controlled by said reception timing means for writing each received packet propagating in said one transmission direction into said random access memory in response to detection of the start of this received packet, and
- addressing means controlled by said emission timing means for successively reading from the cells of said random access memory in an order identical to the writing order, the reading being initiated at a delay time following receipt of a packet propagating in said other transmission direction.

15. The repeater of claim 14 further including a single local clock, a time base source, means for detecting a synchronization word in each received packet propagating in said first and second transmission directions, and means connected to said detection means for locking the time base source to a phase of a single local clock, said time base source synchronously controlling: (a) first means for converting the detected packets in line code into binary code, (b) means for cancelling and inserting said synchronization word, and (c) second means for converting said packets in binary code into line code.

16. The repeater of claim 15 wherein:
- said reception timing means controls said first converting means and said emission timing means controls said cancelling and inserting means and said second converting means in the one propagation transmission direction for which the packets are stored, and the input of said input switching means being connected to the output of said first converting means and the output of said output switching means being connected to the input of said synchronization word cancelling and inserting means.

* * * * *